United States Patent
Zhang et al.

(10) Patent No.: US 11,726,984 B2
(45) Date of Patent: Aug. 15, 2023

(54) DATA REDISTRIBUTION METHOD AND APPARATUS, AND DATABASE CLUSTER

(71) Applicant: Huawei Technologies Co., Ltd., Shenzhen (CN)

(72) Inventors: Xuefu Zhang, Xi'an (CN); Fanbin Meng, Beijing (CN); Hao Xiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 726 days.

(21) Appl. No.: 16/515,479

(22) Filed: Jul. 18, 2019

(65) Prior Publication Data
US 2019/0340171 A1    Nov. 7, 2019

Related U.S. Application Data

(63) Continuation of application No. PCT/CN2018/070005, filed on Jan. 2, 2018.

(30) Foreign Application Priority Data

Jan. 18, 2017 (CN) .......................... 201710038202.9

(51) Int. Cl.
*G06F 16/23* (2019.01)
*G06F 16/27* (2019.01)

(52) U.S. Cl.
CPC ...... *G06F 16/2379* (2019.01); *G06F 16/2343* (2019.01); *G06F 16/2365* (2019.01); *G06F 16/27* (2019.01)

(58) Field of Classification Search
CPC ... G06F 16/27; G06F 16/2343; G06F 16/2379
See application file for complete search history.

(56) References Cited

U.S. PATENT DOCUMENTS

| 4,769,772 A * | 9/1988 | Dwyer | G06F 16/2453 |
| | | | 707/714 |
| 7,577,667 B2 * | 8/2009 | Hinshaw | G06F 16/273 |

(Continued)

FOREIGN PATENT DOCUMENTS

| CN | 102521297 A | 6/2012 |
| CN | 102968503 A | 3/2013 |

(Continued)

OTHER PUBLICATIONS

Machine Translation and Abstract of Chinese Publication No. CN102521297, Jun. 27, 2012, 11 pages.

(Continued)

*Primary Examiner* — Mark E Hershley
(74) *Attorney, Agent, or Firm* — Conley Rose, P.C.

(57) ABSTRACT

A data redistribution method, apparatus and a database cluster includes at least one first node, and an original table is stored on the at least one first node. A data redistribution process for redistributing the original table to the at least one first node and a second node is started, and the data redistribution process includes: starting a first transaction for creating a temporary table on the at least one first node and the second node, and associating an import operation for the original table with an import operation for the temporary table; starting a second transaction for selecting an old tuple from the original table based on a transaction identifier of the first transaction, and redistribute the selected old tuple to the temporary table. After the second transaction ends, metadata of the original table and metadata of the temporary table are exchanged.

20 Claims, 11 Drawing Sheets

(56) References Cited

U.S. PATENT DOCUMENTS

| | | | | |
|---|---|---|---|---|
| 7,702,610 | B2* | 4/2010 | Zane | G16H 50/70 |
| | | | | 707/999.001 |
| 8,010,485 | B1* | 8/2011 | Chatterjee | G06F 3/061 |
| | | | | 707/802 |
| 8,356,050 | B1* | 1/2013 | Olston | G06F 16/986 |
| | | | | 707/769 |
| 8,600,994 | B1 | 12/2013 | Xu et al. | |
| 9,152,808 | B1* | 10/2015 | Ramalingam | G06F 21/62 |
| 2001/0044792 | A1* | 11/2001 | Kikuchi | G06F 16/2343 |
| | | | | 709/219 |
| 2003/0105732 | A1* | 6/2003 | Kagalwala | G06F 16/211 |
| 2005/0144189 | A1* | 6/2005 | Edwards | G06F 16/185 |
| | | | | 707/999.102 |
| 2007/0067297 | A1* | 3/2007 | Kublickis | G06Q 30/02 |
| | | | | 707/999.009 |
| 2007/0156790 | A1* | 7/2007 | Sun Hsu | G06F 16/254 |
| 2007/0294276 | A1* | 12/2007 | Shen | G06F 16/9017 |
| | | | | 707/E17.037 |
| 2008/0086480 | A1* | 4/2008 | Srivastava | G06F 16/27 |
| 2009/0055418 | A1* | 2/2009 | Megerian | G06F 16/24565 |
| 2009/0216910 | A1* | 8/2009 | Duchesneau | G06F 9/5072 |
| | | | | 709/250 |
| 2010/0023564 | A1* | 1/2010 | Yemeni | G06F 16/27 |
| | | | | 707/E17.007 |
| 2011/0219208 | A1* | 9/2011 | Asaad | G06F 9/06 |
| | | | | 712/12 |
| 2013/0204894 | A1* | 8/2013 | Faith | G06F 16/9024 |
| | | | | 707/769 |
| 2013/0290234 | A1* | 10/2013 | Harris | G06Q 30/00 |
| | | | | 901/50 |
| 2013/0306276 | A1* | 11/2013 | Duchesneau | F25D 17/02 |
| | | | | 709/225 |
| 2014/0025899 | A1* | 1/2014 | Dean | G06F 16/23 |
| | | | | 711/133 |
| 2015/0066987 | A1* | 3/2015 | Nelke | G06F 16/21 |
| | | | | 707/781 |
| 2015/0074151 | A1* | 3/2015 | Chaiken | G06F 16/221 |
| | | | | 707/803 |
| 2015/0149444 | A1* | 5/2015 | Bolduc | G06F 16/2471 |
| | | | | 707/722 |
| 2015/0186479 | A1* | 7/2015 | Konersmann | H04L 67/1097 |
| | | | | 707/809 |
| 2015/0347470 | A1* | 12/2015 | Ma | G06F 16/2372 |
| | | | | 707/803 |
| 2016/0028855 | A1* | 1/2016 | Goyal | G06F 9/5055 |
| | | | | 709/203 |
| 2016/0092505 | A1* | 3/2016 | Song | G06F 16/24553 |
| | | | | 707/713 |
| 2016/0147859 | A1* | 5/2016 | Lee | G06F 11/1471 |
| | | | | 707/615 |
| 2016/0162283 | A1 | 6/2016 | Lightner et al. | |
| 2016/0350352 | A1* | 12/2016 | Hase | G06F 16/27 |
| 2017/0091217 | A1* | 3/2017 | Abrashkevich | G06F 3/067 |
| 2017/0177652 | A1* | 6/2017 | Danilov | G06F 3/0652 |
| 2018/0039534 | A1* | 2/2018 | Cai | G06F 11/0751 |
| 2018/0196689 | A1* | 7/2018 | Suda | G06F 9/45558 |
| 2018/0357443 | A1* | 12/2018 | Joscelyne | G06F 21/6227 |

FOREIGN PATENT DOCUMENTS

| | | |
|---|---|---|
| CN | 104484469 A | 4/2015 |
| CN | 104484472 A | 4/2015 |

OTHER PUBLICATIONS

Machine Translation and Abstract of Chinese Publication No. CN104484469, Apr. 1, 2015, 7 pages.

Foreign Communication From a Counterpart Application, PCT Application No. PCT/CN2018/070005, English Translation of International Search Report dated Mar. 28, 2018, 2 pages.

Foreign Communication From a Counterpart Application, PCT Application No. PCT/CN2018/070005, English Translation of Written Opinion dated Mar. 28, 2018, 5 pages.

* cited by examiner

DATA REDISTRIBUTION METHOD AND APPARATUS, AND DATABASE CLUSTER

CROSS-REFERENCE TO RELATED APPLICATIONS

This application is a continuation of International Application No. PCT/CN2018/070005, filed on Jan. 2, 2018, which claims priority to Chinese Patent Application No. 201710038202.9, filed on Jan. 18, 2017. The disclosures of the aforementioned applications are hereby incorporated by reference in their entireties.

TECHNICAL FIELD

The present application relates to database cluster technologies, and in particular, to a data redistribution method and apparatus, and a database cluster.

BACKGROUND

A database cluster is a distributed database that uses at least two database servers to form a virtual single data logic image and then provides, like a single-server database system, a client with a data service. The database cluster mainly has two architectures, a shared disk architecture and a shared nothing architecture. In a database cluster having the shared disk architecture, a plurality of server nodes share a same storage medium, and each node can access full data in the shared storage medium and provide a service to the outside. In a database cluster having the shared nothing architecture, each node has its own memory and disk, no memory or disk is shared between nodes, data in a database is distributed on a plurality of nodes, and the nodes are connected using a network, usually using a dedicated network such as a fiber.

To adapt to different service scenarios, the database cluster is usually scalable. In other words, a node included in the database cluster may be changed depending on a service requirement. For example, with an increase of a data volume, to support a larger-scale data storage and query, scale-out needs to be performed on the database cluster, that is, a new node is added to the cluster and data migration is completed. For the database cluster having the shared nothing architecture, after a new node is added to the database cluster, partial data on an original node needs to be redistributed to the newly added node to complete scale-out. Similarly, if the database cluster has a relatively large quantity of idle resources, scale-in may be performed on the database cluster, that is, some nodes are removed to avoid resource waste. Before a node is removed from the database cluster, data on the to-be-removed node needs to be redistributed to another node. In a data redistribution process, to ensure consistency between data before scale-out and data after scale-out, a table being redistributed is locked, and no read or write operation can be performed on the table, until all data in the table is redistributed.

It can be learned that in a data redistribution phase of an existing database cluster, partial data needs to be locked to ensure data consistency. However, depending on a data volume, a time consumed for data redistribution varies from several hours to several days. As a result, a user cannot perform, for a long time, an operation on data that is being redistributed, and consequently, a service is severely affected.

SUMMARY

Embodiments of the present application provide a data redistribution method and apparatus in a database cluster, and a database cluster to resolve a problem that in a process in which data redistribution is performed in a database cluster, a user cannot perform, for a long time, an operation on data that is being redistributed.

According to a first aspect, an embodiment of the present application provides a data redistribution method used in a database cluster. The database cluster includes at least one first node, an original table is stored on the at least one first node, and the method includes, after a second node is newly added to the database cluster, starting a data redistribution process to redistribute the original table to the at least one first node and the second node, where the original table includes a plurality of tuples, and a transaction identifier of a tuple is an identifier of a transaction that imports the tuple. The data redistribution process includes starting a first transaction, where the first transaction is used to create a temporary table on the at least one first node and the second node and associate an import operation for the original table with an import operation for the temporary table, so that a new tuple imported in the redistribution process is inserted into both the original table and the temporary table, starting a second transaction, where the second transaction is used to select an old tuple from the original table based on a transaction identifier of the first transaction, and redistribute the selected old tuple to the temporary table, and the transaction identifier of the first transaction is greater than a transaction identifier of the old tuple in the original table, and after the second transaction end, exchanging metadata of the original table and metadata of the temporary table.

According to the foregoing method, access to the database cluster and import of the new tuple are allowed during database cluster scale-out, thereby effectively improving processing performance of the database cluster.

With reference to the first aspect, in a possible implementation, the selecting an old tuple from the original table based on a transaction identifier of the first transaction, and redistributing the selected old tuple to the temporary table includes obtaining a transaction identifier of each tuple in the original table, where a tuple whose transaction identifier is less than the transaction identifier of the first transaction is the old tuple, and redistributing the old tuple to the temporary table.

In another possible implementation, the transaction identifier may be a transaction snapshot or a transaction identity (ID).

According to the foregoing method, the new tuple and the old tuple can be effectively distinguished from each other using the transaction identifier, and data redistribution is performed in the newly created temporary table. The original table needs to be scanned only once, and then data redistribution for scale-out can be completed. Compared with a conventional online scale-out manner in which the original table needs to be scanned at least twice for data selection and deletion, processing performance of the database cluster system can be effectively improved.

With reference to the first aspect, in another possible implementation, the associating an import operation for the original table with an import operation for the temporary table may include creating an association rule for the import operations for the original table and the temporary table, where the association rule is used to instruct to insert the imported new tuple into both the original table and the temporary table.

In another possible implementation, the associating an import operation for the original table with an import operation for the temporary table includes creating a trigger for the import operations for the original table and the temporary table, where the trigger is configured to insert the imported new tuple into both the original table and the temporary table.

In the foregoing implementation, the import operation for the original table is associated with the import operation for the temporary table by creating the association rule or the trigger. In this way, access to the database cluster and import of the new tuple are allowed during database cluster scale-out, thereby effectively improving a processing performance of the database cluster.

With reference to the first aspect and any possible implementation of the first aspect, in another possible implementation of the first aspect, the exchanging metadata of the original table and metadata of the temporary table includes starting a third transaction, where the third transaction sets an access exclusive lock for each of the original table and the temporary table, and exchanging the metadata of the original table and the metadata of the temporary table, and modifying distribution node information of the original table, where the modified distribution node information of the original table includes information about the at least one first node and the second node. In this implementation, according to a method for performing database cluster scale-out using three transactions, the data redistribution process during database cluster scale-out is protected by the transactions. When an exception occurs in the data redistribution process, a transaction currently being executed is rolled back, and data redistribution is performed again. In other words, redistribution can still be performed even though a previous transaction execution fails, and reentry of the entire process can be supported.

In a possible implementation, the distribution node information may include identifiers of the at least one first node and the second node. In another possible implementation, the distribution node information may include address information, for example, Internet Protocol (IP) addresses and/or medium access control (MAC) addresses, of the at least one first node and the second node.

With reference to the first aspect and any possible implementation of the first aspect, in another possible implementation of the first aspect, the data redistribution method may further include setting an access shared lock for the original table, where the access shared lock is used to allow a new tuple to be imported into the original table in the redistribution process. The operation of setting an access shared lock may be implemented by the second transaction, or may be implemented by another separate transaction.

According to a second aspect, an embodiment of the present application provides a data redistribution apparatus in a database cluster. The apparatus is configured to perform the foregoing method steps. The apparatus may be implemented using hardware, or may be implemented by executing corresponding software by hardware. The hardware or software includes one or more modules corresponding to the foregoing function.

With reference to the second aspect, in a possible implementation of the second aspect, the apparatus includes a processing module and a transceiver module, and the processing module sends one or more instructions to nodes in the database cluster using the transceiver module, to instruct some or all of the nodes in the database cluster to perform steps described in the foregoing any aspect or any possible implementation of the any aspect.

For beneficial effects of the apparatus provided in the second aspect and each possible implementation of the second aspect, refer to beneficial effects brought by the method provided in the first aspect and each possible implementation of the first aspect. Details are not described herein again.

According to another aspect, an embodiment of the present application provides a database cluster. The database cluster includes at least one first node and the data redistribution apparatus described in the second aspect.

According to still another aspect, an embodiment of the present application provides a computer storage medium, configured to store a computer software instruction used by the foregoing data redistribution apparatus. The computer software instruction includes a program designed for executing the foregoing aspect.

According to the data redistribution method and apparatus, and the database cluster in the embodiments of the present application, during database cluster scale-out, after a node is newly added to the database cluster, a temporary table is created on an original node and the newly added node, and a tuple import operation for an original table stored on the original node is associated with a tuple import operation for the temporary table created in the redistribution process, so that newly imported data can be inserted into both the original table and the temporary table in the redistribution process. In addition, new data is isolated from old data in the original table using a transaction snapshot or a transaction ID. Therefore, in a scale-out process, data import is allowed for a table on which scale-out is being performed. This improves a processing capability of ensuring an uninterrupted service, while implementing data redistribution during scale-out by the database cluster system.

DESCRIPTION OF EMBODIMENTS

The following describes the embodiments of the present disclosure with reference to accompanying drawings.

Figure 1A:
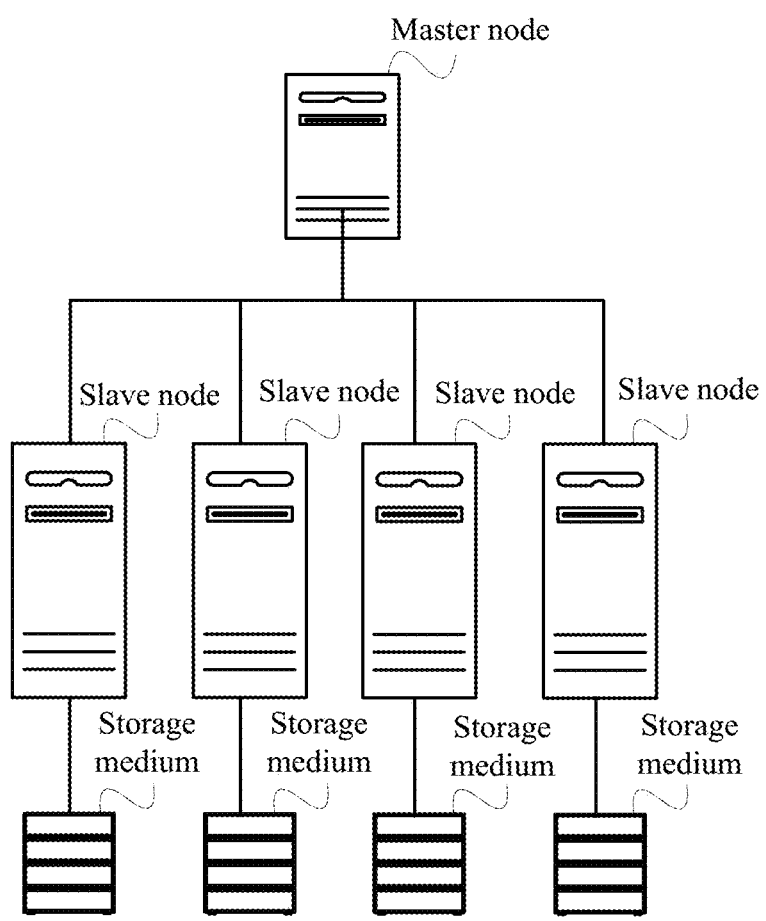
FIG. 1A is a schematic diagram of an application scenario according to an embodiment of the present application.

FIG. 1A is a schematic diagram of an application scenario according to an embodiment of the present disclosure. As shown in FIG. 1A, a data redistribution method in the embodiments of the present disclosure may be applied to a database cluster in FIG. 1A. FIG. 1A shows a typical database cluster having a shared nothing architecture. The database cluster includes at least one master node and several slave nodes. As shown in FIG. 1A, each node in the database cluster may be a server, or a virtual machine that runs on commodity hardware, and has its own private central processing unit (CPU) and nonvolatile storage medium. The storage medium may be a memory, a hard disk, a disk array, or the like. There is no shared resource between the nodes, and the nodes interact with each other using a network or in another communication mode. Therefore, the database cluster has a relatively high parallel processing and scale-out capability. The nodes each process respective data, and aggregate processed results at an upper layer or transfer processed structures between other nodes. For example, when a table in a database is stored, the table is split horizontally based on a physical storage medium and allocated to a plurality of nodes in a database cluster. Each node can independently process data stored on the node. According to the data redistribution method in the embodiments of the present disclosure, a new tuple can be imported in a database cluster scale-out or scale-in process, thereby effectively resolving a problem that in the database cluster scale-out or scale-in process, a user cannot perform, for a long time, an operation on data that is being redistributed.

An execution body that performs the data redistribution method in the embodiments of the present disclosure may be a master node in a database cluster architecture, shown in FIG. 1A, that has a master node. In an embodiment, in the database cluster architecture, shown in FIG. 1A, that has a master node, the master node provides the other slave nodes with a service for communication with and connection to the outside. That is, the master node synchronously sends all received instructions (a message, a transaction, subscription, or the like) to each slave node connected to the master node.

Figure 1B:
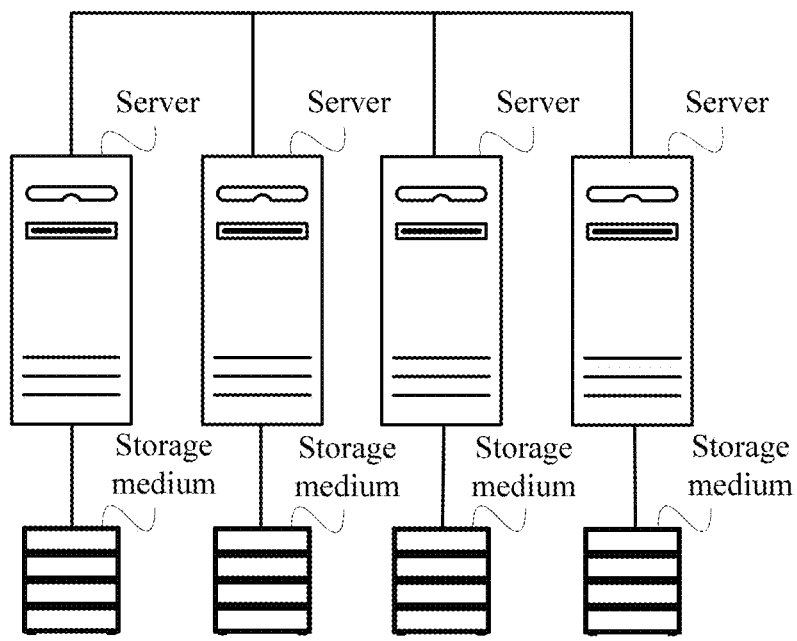
FIG. 1B is a schematic diagram of another application scenario according to an embodiment of the present application.

There is also a typical shared nothing architecture different from the database cluster, in FIG. 1A, that has a master node. In an embodiment the shared nothing architecture is a shared nothing architecture having no master node. FIG. 1B is a schematic diagram of another application scenario according to an embodiment of the present disclosure. In a database cluster, shown in FIG. 1B, that has no master node, in addition to providing data read/write and query services, a node in the database cluster provides other nodes in the database cluster architecture with a service for communication with and connection to the outside. In other words, the node plays a role similar to the master node described in FIG. 1A. The node may also perform the data redistribution method in a database cluster in the embodiments of the present disclosure, thereby effectively resolving a problem that in a database cluster scale-out or scale-in process, a user cannot perform, for a long time, an operation on data that is being redistributed. An execution body that performs the data redistribution method in the embodiments of the present disclosure may be any node in the database cluster architecture shown in FIG. 1B.

A term "database transaction (transaction for short)" in the specification, claims, and accompanying drawings of the present application is a logical unit in a database system, and includes a limited database operation sequence. Each transaction has a unique transaction identifier. A transaction in a database cluster is usually a distributed transaction. The distributed transaction means that a node supporting the transaction and a transaction manager are separately located on different nodes. The transaction is started or triggered, and managed by a node, but operations included in the transaction may be distributed on another node, that is, may be performed by one or more other nodes. The distributed transaction needs to ensure that these operations either all succeed or all fail to ensure data consistency. In the database system, data is usually stored in a form of a table, and a tuple is a basic element of the table. One table includes one or more tuples, and these tuples may be imported or modified by different transactions. A transaction identifier of a tuple is defined as an identifier of a transaction that imports the tuple.

Figure 2:
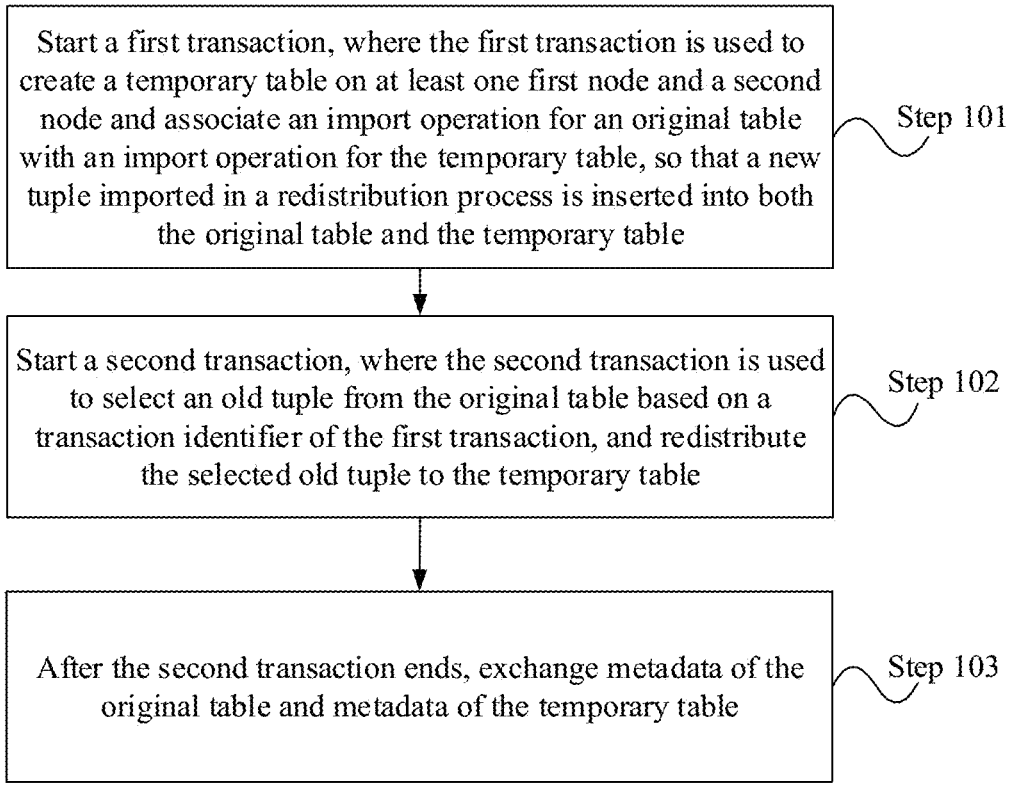
FIG. 2 is a flowchart of a data redistribution method used during database cluster scale-out according to an embodiment of the present application.

FIG. 2 is a flowchart of a data redistribution method used during database cluster scale-out according to an embodiment of the present disclosure. A database cluster includes at least one first node, and an original table is stored on the at least one first node. As shown in FIG. 2, the method in this embodiment may include, after a second node is newly added to the database cluster, starting a data redistribution process, where the data redistribution process is used to redistribute the original table to the at least one first node and the second node. The original table may include a plurality of tuples, and a transaction identifier of each tuple is an identifier of a transaction that imports the tuple. The first node is an original node. The second node is a newly added node, that is, a node newly added for implementing database cluster scale-out. There may be one or more second nodes. In an embodiment a quantity of second nodes may be flexibly configured depending on an actual requirement.

After the second node is added to the database cluster, the following method steps are used to complete data redistribution and implement database cluster scale-out.

Step 101: Start a first transaction, where the first transaction is used to create a temporary table on the at least one first node and the second node and associate an import operation for the original table with an import operation for the temporary table, so that a new tuple imported in the redistribution process is inserted into both the original table and the temporary table.

A transaction identifier of the first transaction is greater than a transaction identifier of an old tuple in the original table.

The import operation for the original table is associated with the import operation for the temporary table to insert the new tuple imported in the redistribution process into both the original table and the temporary table, that is, dual-insertion of the imported new tuple is implemented.

In an embodiment in a service scenario, if a current database cluster cannot meet a service requirement of a user, scale-out needs to be performed on the current database cluster, and a server and a storage medium connected to the server are added on the basis of the current database cluster (at least one first node). After the server (a second node) and the storage medium connected to the server are added to the database cluster, operations such as networking configuration and information synchronization (for example, metadata synchronization) need to be performed. Then, the newly added server and the storage medium connected to the newly added server can be used. After the new server is added to the database cluster, data redistribution needs to be performed on an original node (the at least one first node) and the newly added node (the second node), that is, step 101 is performed. The created temporary table is distributed on the at least one first node and the second node. That is, the temporary table may include a plurality of sub-tables, the plurality of sub-tables are located in storage media connected to different nodes, and the nodes perform parallel processing on the sub-tables. Therefore, data processing efficiency of the database cluster can be effectively improved.

Step 102: Start a second transaction, where the second transaction is used to select an old tuple from the original table based on a transaction identifier of the first transaction, and redistribute the selected old tuple to the temporary table.

In an embodiment according to a database cluster scale-out method in this embodiment, during scale-out, the temporary table is first created on the at least one first node and the second node using the first transaction in step 101, and a transaction identifier of a transaction that creates the temporary table is recorded. After step 101 is completed, import of a new tuple may be allowed in the method in this embodiment. In an embodiment the new tuple is imported in the second transaction. Therefore, a transaction identifier of the new tuple is different from the transaction identifier of the old tuple. To ensure precise data rollback after the database cluster is faulty, the transaction identifier usually increases with time. In this embodiment of the present disclosure, the new tuple and the old tuple can be effectively distinguished from each other using the transaction identifier of the first transaction, so that the old tuple can be selected from the original table using the transaction identifier of the first transaction, the old tuple is redistributed to the temporary table, and the new tuple is distributed to the temporary table. A distribution manner of data on the at least one first node and the second node may be hash distribution, and certainly, may be another distribution manner. Examples are not described herein one by one.

Step 103: After the second transaction ends, exchange metadata of the original table and metadata of the temporary table.

Metadata, also referred to as intermediary data or relay data, is data about data, is mainly information describing a data attribute, and is used to support functions such as storage location indication, historical data and resource searching, and file recording. For example, the metadata of the original table may include table data file information mapped to the original table, and the metadata of the temporary table may include table data file information mapped to the temporary table. In an embodiment the database cluster stores a table name and physical file information corresponding to the table name. After data migration is completed using step 101 and step 102, the metadata of the original table and the metadata of the temporary table further need to be exchanged, so that a user can correctly access data obtained after data redistribution.

It can be learned that database cluster scale-out is implemented using step 101 to step 103, and import of the new tuple may be allowed after step 101. This can effectively avoid a problem that due to database cluster scale-out, a user cannot perform, for a long time, an operation on data that is being redistributed, and consequently great inconvenience is brought to the user.

Optionally, a specific implementation of step 102 of selecting an old tuple from the original table based on a transaction identifier of the first transaction, and redistributing the selected old tuple to the temporary table may be obtaining a transaction identifier of each tuple in the original table, where a tuple whose transaction identifier is less than the transaction identifier of the first transaction is the old tuple, and redistributing the old tuple to the temporary table.

A specific implementation of associating an import operation for the original table with an import operation for the temporary table may be creating an association rule (CREATE RULE) for the import operations for the original table and the temporary table, where the association rule is used to instruct to insert the imported new tuple into both the original table and the temporary table, or creating a trigger (CREATE TRIGGER) for the import operations for the original table and the temporary table, where the trigger is configured to insert the imported new tuple into both the original table and the temporary table.

Optionally, a specific implementation of step 103 of exchanging metadata of the original table and metadata of the temporary table may be starting a third transaction, where the third transaction sets an access exclusive lock for each of the original table and the temporary table, and exchanging the metadata of the original table and the metadata of the temporary table, and modifying distribution node information of the original table, where the modified distribution node information of the original table includes information about the at least one first node and the second node.

Optionally, after step 103 is completed, the temporary table may further be deleted, and the created association rule or trigger may be deleted.

The second transaction may set an access shared lock for the original table. The access shared lock is used to allow the new tuple to be imported into the original table in the redistribution process, that is, to allow a user to perform an operation on the data that is being redistributed.

Optionally, the transaction identifier includes a transaction snapshot or a transaction ID.

It should be noted that during execution of step 101, the first transaction may be started to set an ephemeral access exclusive lock for the original table to create the temporary table and associate the import operation for the original table with the import operation for the temporary table.

It should be noted that ephemeral access exclusive locks set by the first transaction and the third transaction both last for a relatively short time, and the second transaction sets the access shared lock during data migration, that is, access and an operation of importing the new tuple are allowed. Such a setting can effectively reduce a time during which the user cannot perform an operation in a database cluster scale-out process.

In this embodiment, after the second node is newly added to the database cluster, the data redistribution process is started, and the data redistribution process is used to redistribute the original table to the at least one first node and the second node. The data redistribution process may include starting the first transaction, where the first transaction is used to create the temporary table on the at least one first node and the second node and associate the import operation for the original table with the import operation for the temporary table, so that the new tuple imported in the redistribution process is inserted into both the original table and the temporary table, and the transaction identifier of the first transaction is greater than the transaction identifier of the old tuple in the original table, starting the second transaction, where the second transaction is used to select the old tuple from the original table based on the transaction identifier of the first transaction, and redistribute the selected old tuple to the temporary table, and after the second transaction ends, exchanging the metadata of the original table and the metadata of the temporary table. In this way, access to the database cluster and import of the new tuple are allowed during database cluster scale-out, thereby effectively improving processing performance of the database cluster.

The following uses several specific embodiments to describe in detail the technical solution of the method embodiment shown in FIG. 2.

For clearer understanding of the foregoing embodiment of the present disclosure, an example in which a current database cluster includes four nodes (Dn1, Dn2, Dn3, and Dn4), and two nodes (Dn5 and Dn6) are to be newly added is used for description.

Figure 3A:
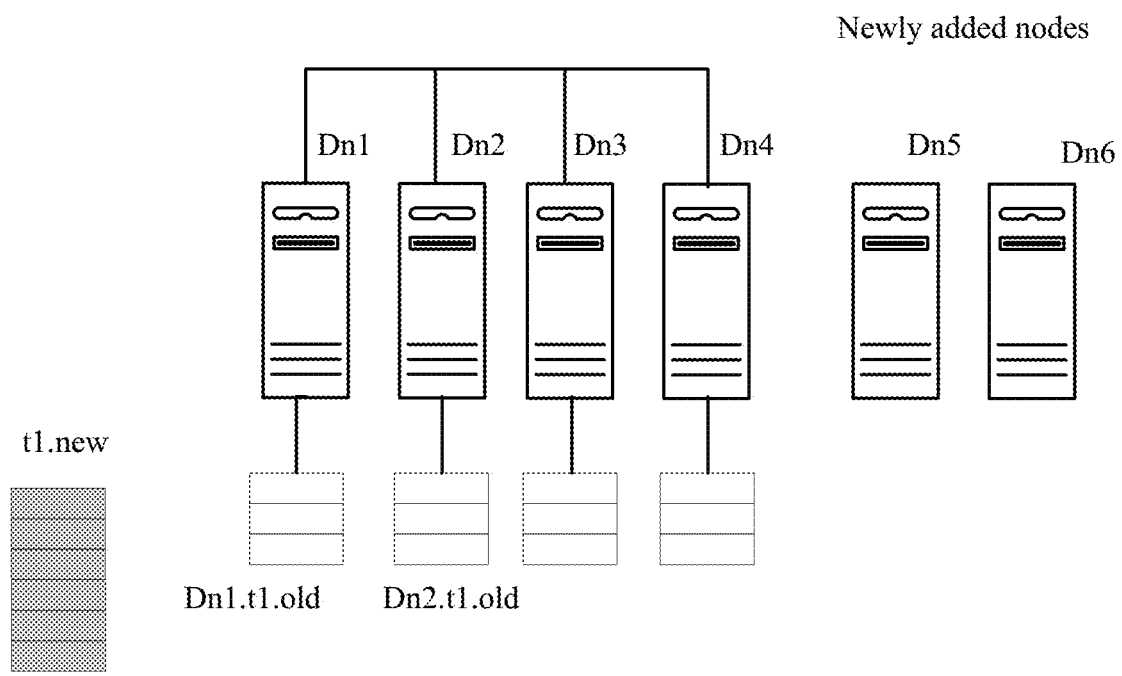
FIG. 3A is a schematic diagram of an initial phase of data redistribution.
Figure 3B:
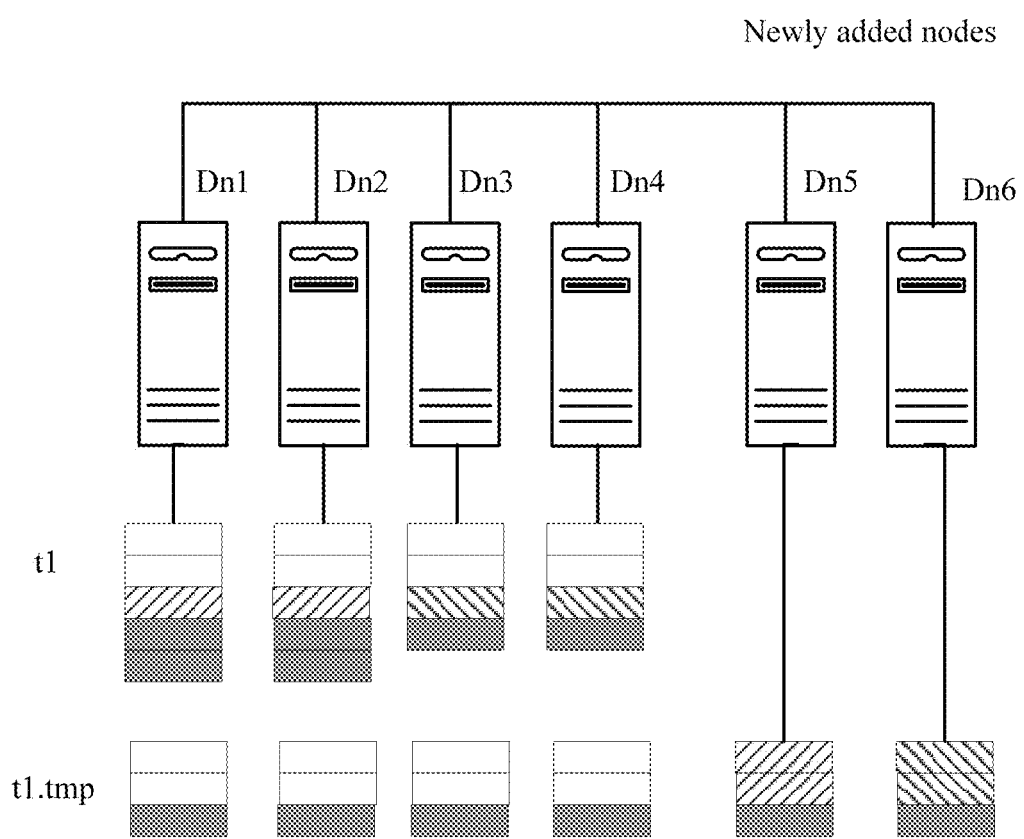
FIG. 3B is a schematic diagram of an intermediate phase of data redistribution.
Figure 3C:
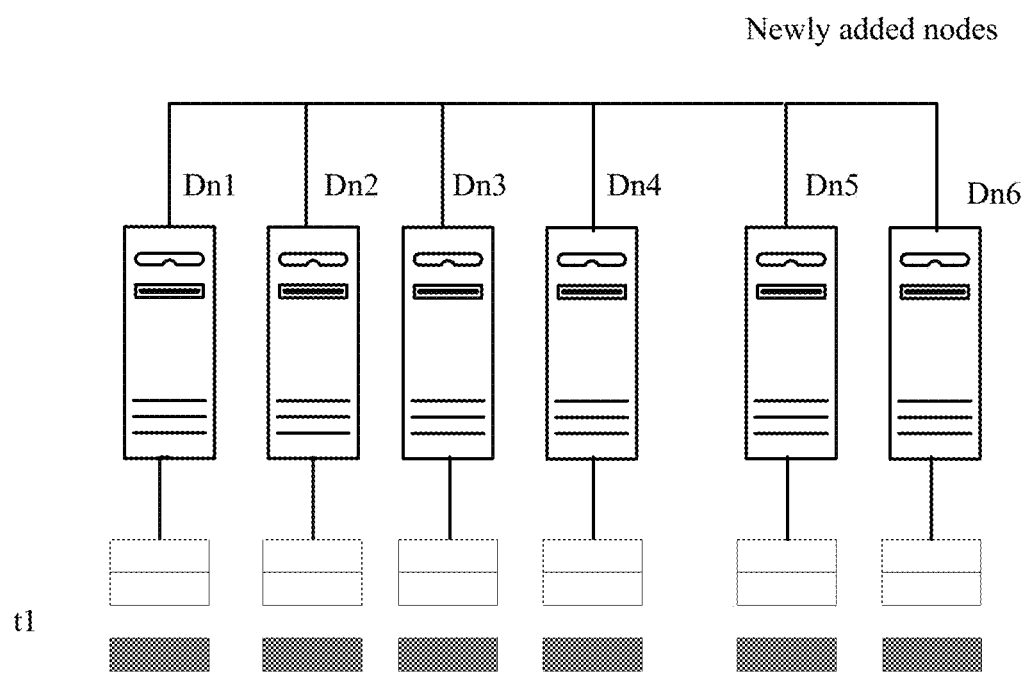
FIG. 3C is a schematic diagram of completion of data redistribution.

FIG. 3A is a schematic diagram of an initial phase of data redistribution, FIG. 3B is a schematic diagram of an intermediate phase of data redistribution, and FIG. 3C is a schematic diagram of completion of data redistribution. As shown in FIG. 3A, each of the four nodes (Dn1, Dn2, Dn3, and Dn4) included in the current database cluster is connected to a storage medium, and an original table t1 is split into a plurality of sub-tables (Dn1.t1.old, Dn2.t1.old, Dn3.t1.old, and Dn4.t1.old), and the sub-tables are respectively stored in storage media corresponding to the nodes. For ease of understanding, FIG. 3A and FIG. 3B show only the sub-tables, and do not show the storage media. In FIG. 3A, t1.new represents a new tuple that needs to be imported into the database cluster, ".old" is used to indicate that a tuple in the sub-table is an old tuple, and ".new" is used to indicate that a tuple in the table is a new tuple. Because the database cluster cannot meet a service requirement of a user, database cluster scale-out needs to be performed, that is, two nodes (Dn5 and Dn6) need to be newly added. Networking configuration and information synchronization need to be correspondingly performed for the two added nodes. The two added nodes can form a new database cluster together with the original nodes (Dn1, Dn2, Dn3, and Dn4). The database cluster includes six nodes, initial data is distributed on Dn1 to Dn4, and there is no data of t1 on the newly added nodes Dn5 and Dn6. After being added to the database cluster, connection manners of the newly added nodes Dn5 and Dn6 may be shown in FIG. 3B. That is, Dn5 and Dn6 are interconnected with the other original nodes in the database cluster.

After the foregoing step is completed, the database cluster needs to perform data redistribution on the original nodes and the newly added nodes (Dn1 to Dn6). In a data redistribution process, a temporary table t1.tmp first needs to be created on Dn1 to Dn6. The temporary table t1.tmp is split into a plurality of sub-tables that are separately located in different storage media. As shown in FIG. 3B, the plurality of sub-tables of the temporary table t1.tmp are respectively located in storage media connected to Dn1, Dn2, Dn3, Dn4, Dn5, and Dn6. After the temporary table t1.tmp is created, old tuples in the original table t1 need to be redistributed to t1.tmp, and an import operation for the original table t1 needs to be associated with an import operation for the temporary table t1.tmp, so that a to-be-imported new tuple t1.new is imported into both t1 and t1.tmp, that is, dual-insertion is performed on t1 and t1.tmp. In a process in which the new tuple t1.new is imported, the tuples in the original table t1 further need to be redistributed to the temporary table t1.tmp. In a process in which the old tuples are redistributed, the old tuples and the new tuple may be distinguished from each other using an identifier of a transaction that creates the temporary table t1.tmp, so that the old tuples are redistributed to the temporary table t1.tmp. In an embodiment as shown in FIG. 3B, the old tuples in the original table t1 are originally distributed on Dn1 to Dn4, and to perform database cluster scale-out, the old tuples need to be redistributed to Dn1 to Dn6. That is, some of the old tuples that are originally in Dn1 to Dn4 need to be migrated to Dn5 and Dn6. As shown in FIG. 3B, tuples in t1 that are marked with diagonal lines need to be migrated to Dn5 and Dn6. In the data redistribution process, import of a new tuple t1.new is allowed.

Data redistribution is completed using the foregoing steps. As shown in FIG. 3C, old tuples and new tuples are evenly distributed in Dn1 to Dn6. After data redistribution is completed, metadata of the original table t1 and metadata of the temporary table t1.tmp further need to be exchanged, and t1.tmp needs to be deleted.

Figure 4:
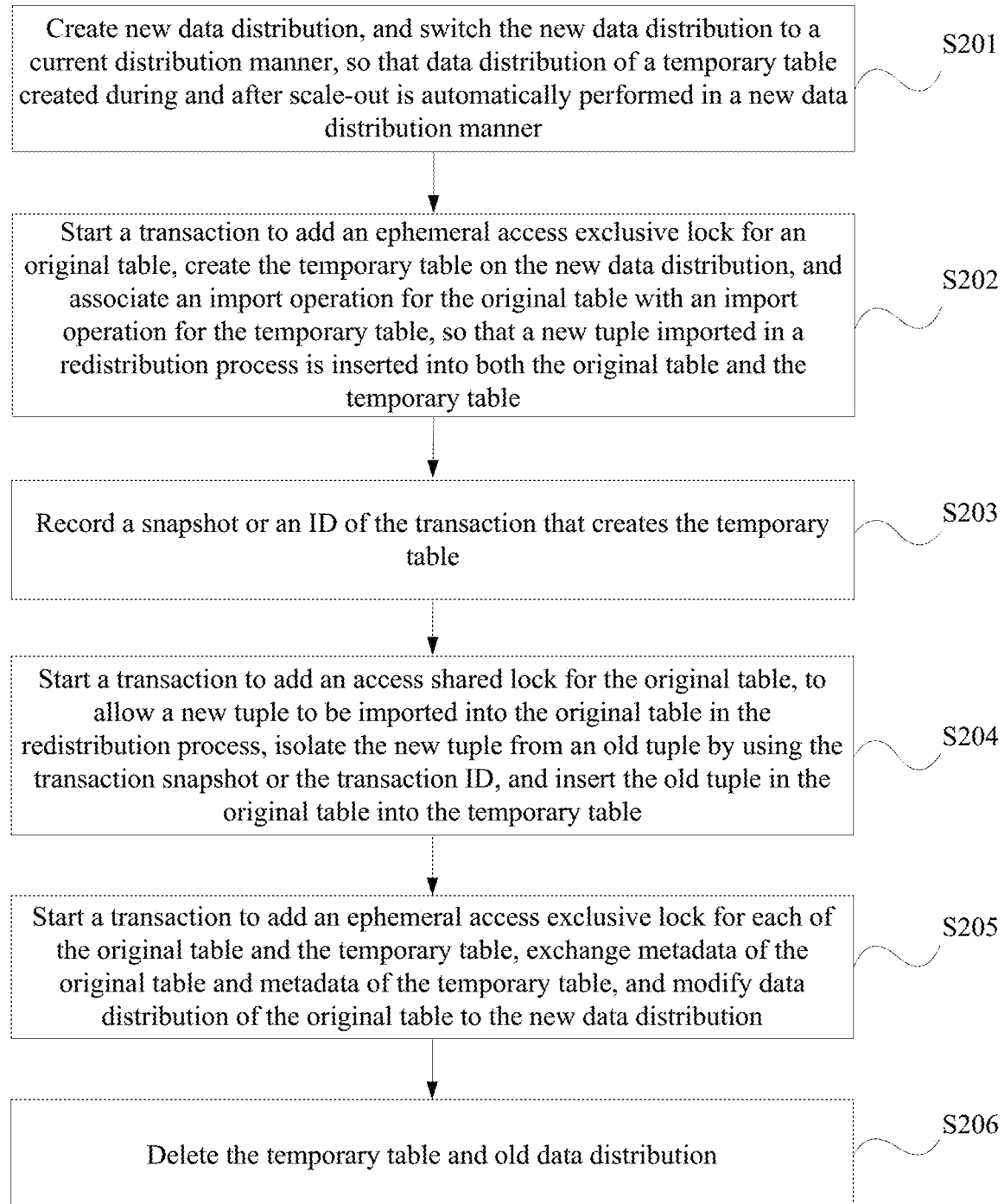
FIG. 4 is a flowchart of another data redistribution method used during database cluster scale-out according to an embodiment of the present application.

FIG. 4 is a flowchart of another data redistribution method used during database cluster scale-out according to an embodiment of the present disclosure. As shown in FIG. 4, the method in this embodiment may include the following steps.

S201. Create new data distribution, and switch the new data distribution to a current distribution manner, so that data distribution for a temporary table created during and after scale-out is automatically performed in a new data distribution manner.

S202. Start a transaction to add an ephemeral access exclusive lock for an original table, create the temporary table on the new data distribution, and associate an import operation for the original table with an import operation for the temporary table, so that a new tuple imported in a redistribution process is inserted into both the original table and the temporary table.

After S202 is completed, the transaction is committed.

S203. Record a snapshot or an ID of the transaction that creates the temporary table.

S204. Start a transaction to add an access shared lock for the original table, to allow a new tuple to be imported into the original table in the redistribution process, isolate the new tuple from an old tuple using the transaction snapshot or the transaction ID, and insert the old tuple in the original table into the temporary table.

The new tuple is synchronously inserted into the temporary table and the original table by associating the import operation for the original table with the import operation for the temporary table in S202 to implement concurrency of scale-out and import. A specific implementation of redistributing the old tuple in the original table to the temporary table may be searching the original table for a tuple whose transaction snapshot or transaction ID is less than the transaction snapshot or the transaction ID in S204, and adding the tuple to the temporary table.

After S204 is completed, the transaction is committed.

S205. Start a transaction to add an ephemeral access exclusive lock for each of the original table and the temporary table, exchange metadata of the original table and metadata of the temporary table, and modify data distribution of the original table to the new data distribution.

At this time, all tuples in the original table have been distributed to data nodes existing after scale-out.

After S205 is completed, the transaction is committed.

S206. Delete the temporary table and old data distribution.

In this embodiment, the old tuple and the new tuple in the original table are distinguished from each other using the transaction snapshot or the transaction ID, so that import of the new tuple is allowed in a database cluster scale-out process. This avoids long-time blocking caused because a new tuple cannot be imported in the database cluster scale-out process. Compared with a conventional database cluster scale-out manner in which scanning needs to be performed at least twice during data redistribution, in this embodiment, scanning needs to be performed only once, and then data redistribution can be completed, because tuple selection is performed by creating the temporary table and using the transaction snapshot or the transaction ID, and a selected tuple is redistributed to the temporary table. Therefore, processing performance of a database cluster system can be further improved. In addition, a database scale-out method in this embodiment of the present disclosure is completed using three transactions, so that a data redistribution process during database cluster scale-out is protected by the transactions. When an exception occurs in the data redistribution process, a transaction currently being executed is rolled back, and data redistribution is performed again. In other words, redistribution can still be performed even though a previous transaction execution fails, and reentry of the entire process can be supported.

It can be understood that in this embodiment of the present disclosure, a dual-insertion manner is used for the original table and the temporary table that is created in the redistribution process, so that a new tuple that needs to be imported is imported into both the original table and the temporary table. The new tuple and the old tuple in the original table are isolated from each other using the transaction snapshot or the transaction ID to support simultaneous implementation of old-tuple redistribution and new-tuple import in the scale-out process. Similarly, the data redistribution method used in the foregoing scale-out process may also be applied to an implementation scenario of database cluster scale-in. For a specific implementation, refer to specific explanations in the following embodiment.

An example in which a current database cluster includes six servers (Dn1, Dn2, Dn3, Dn4, Dn5, and Dn6), and two servers (Dn5 and Dn6) are to be deleted is used for description.

Figure 5A:
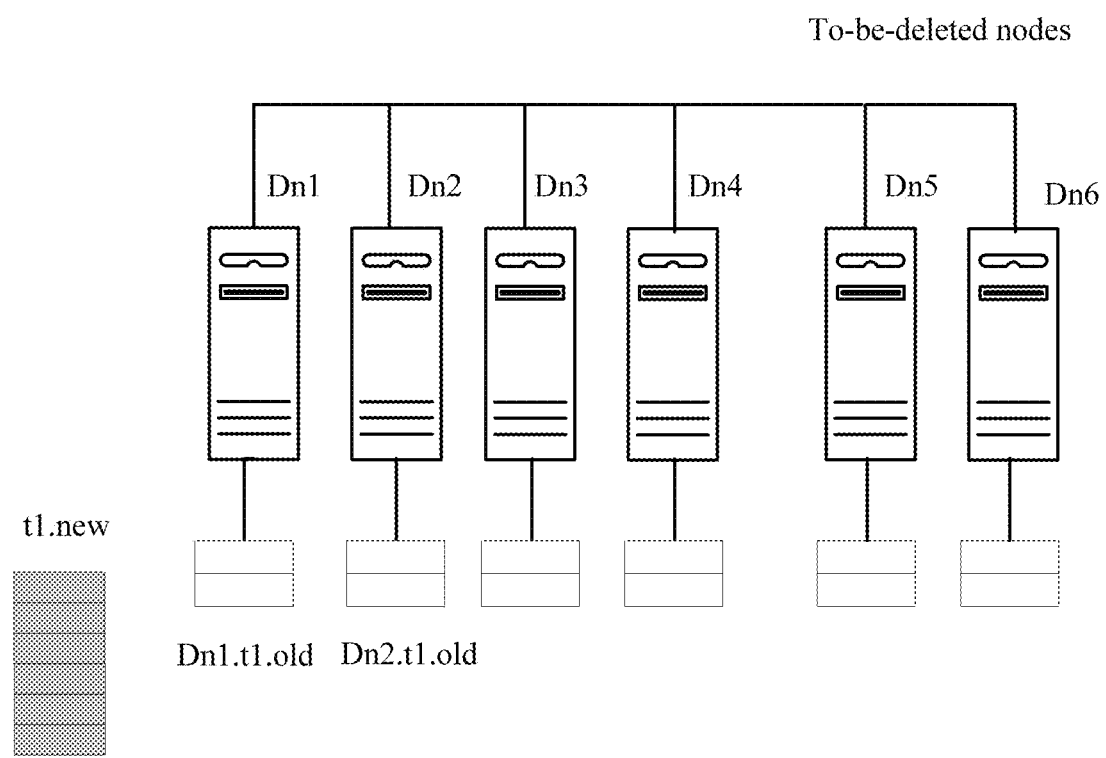
FIG. 5A is a schematic diagram of an initial phase of data redistribution.
Figure 5B:
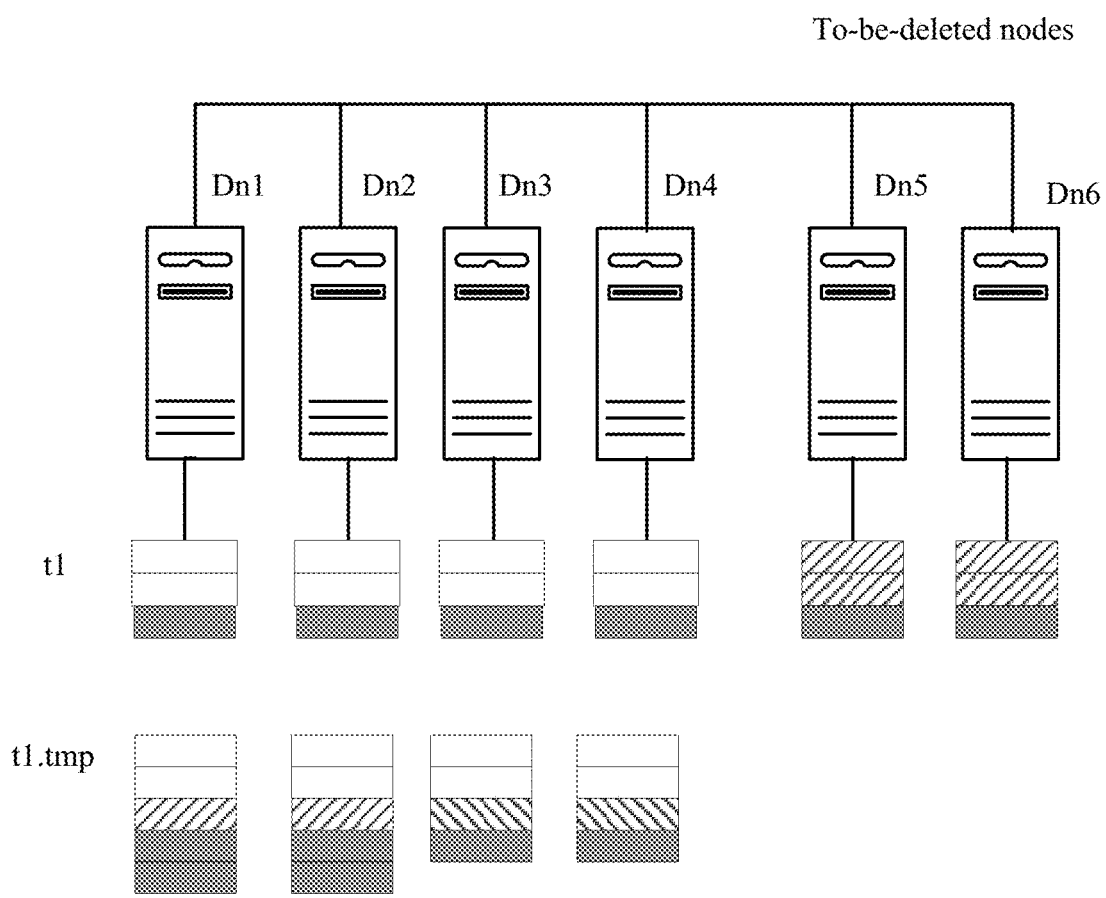
FIG. 5B is a schematic diagram of an intermediate phase of data redistribution.
Figure 5C:
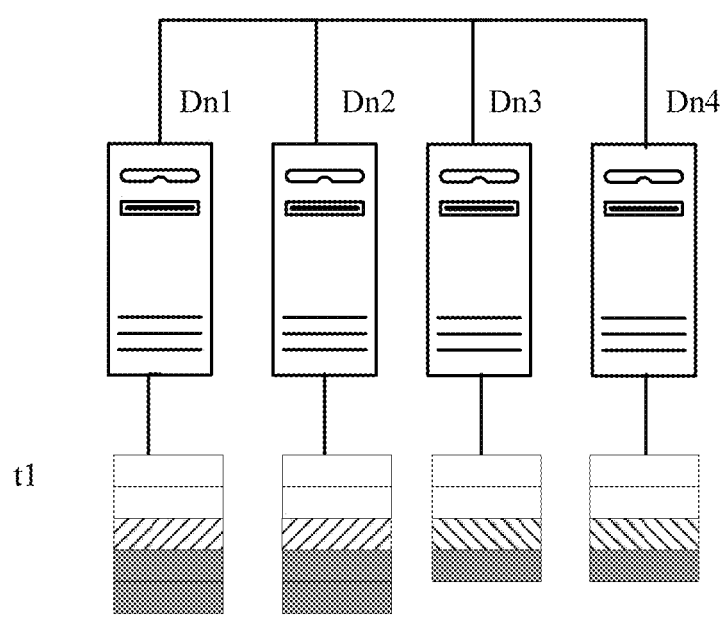
FIG. 5C is a schematic diagram of completion of data redistribution.

FIG. 5A is a schematic diagram of an initial phase of data redistribution, FIG. 5B is a schematic diagram of an intermediate phase of data redistribution, and FIG. 5C is a schematic diagram of completion of data redistribution. As shown in FIG. 5A, each of the six nodes (Dn1, Dn2, Dn3, Dn4, Dn5, and Dn6) included in the current database cluster is connected to a storage medium, and an original table t1 is split into a plurality of sub-tables (Dn1.t1.old, Dn2.t1.old, Dn3.t1.old, Dn4.t1.old, Dn5.t1.old, and Dn4.t1.old), and the sub-tables are respectively stored in storage media corresponding to the nodes. For ease of understanding, FIG. 5A and FIG. 5B show only the sub-tables, and do not show the storage media. In FIG. 5A, t1.new represents a new tuple that needs to be imported into the database cluster, ".old" is used to indicate that a tuple in the sub-table is an old tuple, and ".new" is used to indicate that a tuple in the table is a new tuple. Because there are a large quantity of idle storage media in the database cluster, database cluster scale-in may be performed, and two nodes (Dn5 and Dn6) may be deleted to improve database cluster utilization. Initial data is distributed on Dn1 to Dn6. Therefore, before Dn5 and Dn6 are deleted, data on Dn5 and Dn6 needs to be migrated to Dn1, Dn2, Dn3, and Dn4, that is, data redistribution is performed.

In a data redistribution process, a temporary table t1.tmp first needs to be created on Dn1 to Dn4. The temporary table t1.tmp is split into a plurality of sub-tables that are separately located in different storage media. As shown in FIG. 5B, the plurality of sub-tables of the temporary table t1.tmp are respectively located in storage media connected to Dn1, Dn2, Dn3, and Dn4. After the temporary table t1.tmp is created, old tuples in the original table t1 needs to be redistributed to t1.tmp, and an import operation for the original table t1 needs to be associated with an import operation for the temporary table t1.tmp, so that a to-be-imported new tuple t1.new is imported into both t1 and t1.tmp, that is, dual-insertion is performed on t1 and t1.tmp. In a process in which the new tuple t1.new is imported, tuples in the original table t1 further need to be redistributed to the temporary table t1.tmp. In a process in which the old tuples are redistributed, the old tuples and the new tuple may be distinguished from each other using an identifier of a transaction that creates the temporary table t1.tmp, so that the old tuples are redistributed to the temporary table t1.tmp. In an embodiment as shown in FIG. 5B, the old tuples in the original table t1 are originally distributed on Dn1 to Dn6, and to perform database cluster scale-in, the old tuples need to be redistributed to Dn1 to Dn4. That is, some of old tuples that are originally in Dn5 and Dn6 need to be migrated to Dn1 to Dn4. As shown in FIG. 5B, tuples in t1 that are marked with diagonal lines need to be migrated to Dn1 to Dn4. In the data redistribution process, import of a new tuple t1.new is allowed.

Data redistribution is completed using the foregoing steps. As shown in FIG. 5C, old tuples and new tuples are evenly distributed in Dn1 to Dn4. After data redistribution is completed, metadata of the original table t1 and metadata of the temporary table t1.tmp further need to be exchanged, t1.tmp needs to be deleted, Dn5 and Dn6 need to be deleted, and networking configuration also needs to be updated.

Figure 6:
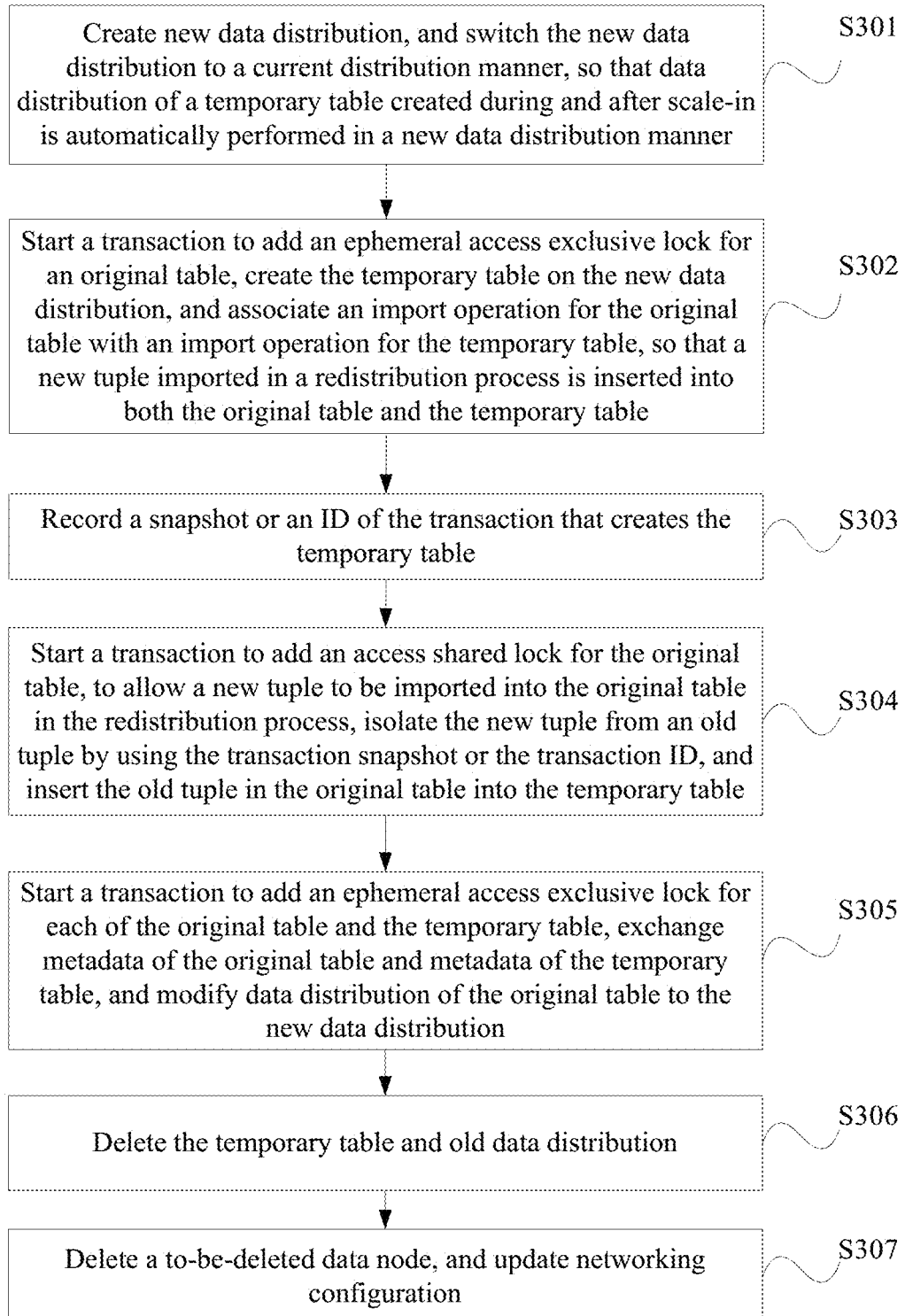
FIG. 6 is a flowchart of a data redistribution method used during database cluster scale-in according to an embodiment of the present application.

FIG. 6 is a flowchart of a data redistribution method used during database cluster scale-in according to an embodiment of the present disclosure. As shown in FIG. 6, the method in this embodiment may include the following steps.

S301. Create new data distribution, and switch the new data distribution to a current distribution manner, so that data distribution for a temporary table created during and after scale-in is automatically performed in a new data distribution manner.

S302. Start a transaction to add an ephemeral access exclusive lock for an original table, create the temporary table on the new data distribution, and associate an import operation for the original table with an import operation for the temporary table, so that a new tuple imported in a redistribution process is inserted into both the original table and the temporary table.

After S302 is completed, the transaction is committed.

S303. Record a snapshot or an ID of the transaction that creates the temporary table.

S304. Start a transaction to add an access shared lock for the original table, to allow a new tuple to be imported into the original table in the redistribution process, isolate the new tuple from an old tuple using the transaction snapshot or the transaction ID, and insert the old tuple in the original table into the temporary table.

The new tuple is synchronously inserted into the temporary table and the original table by associating the import operation for the original table with the import operation for the temporary table in S302 to implement concurrency of scale-in and import. A specific implementation of redistributing the old tuple in the original table to the temporary table may be searching the original table for a tuple whose transaction snapshot or transaction ID is less than the transaction snapshot or the transaction ID in S304, and adding the tuple to the temporary table.

After S304 is completed, the transaction is committed.

S305. Start a transaction to add an ephemeral access exclusive lock for each of the original table and the temporary table, exchange metadata of the original table and metadata of the temporary table, and modify data distribution of the original table to the new data distribution.

At this time, all tuples in the original table have been distributed to data nodes existing after scale-in.

After S305 is completed, the transaction is committed.

S306. Delete the temporary table and old data distribution.

S307. Delete a to-be-deleted data node, and update networking configuration.

In this embodiment, the old tuple and the new tuple in the original table are distinguished from each other using the transaction snapshot or the transaction ID, so that import of the new tuple is allowed in a database cluster scale-in process. This avoids long-time blocking caused because a new tuple cannot be imported in the database cluster scale-in process. Compared with a conventional database cluster scale-in manner in which scanning needs to be performed at least twice during data redistribution, in this embodiment, scanning needs to be performed only once, and then data redistribution can be completed, because tuple selection is performed by creating the temporary table and using the transaction snapshot or the transaction ID, and a selected tuple is redistributed to the temporary table. Therefore, processing performance of a database cluster system can be further improved. In addition, a database scale-in method in this embodiment of the present disclosure is completed using three transactions, so that a data redistribution process during database cluster scale-in is protected by the transactions. When an exception occurs in the data redistribution process, a transaction currently being executed is rolled back, and data redistribution is performed again. In other words, redistribution can still be performed even though a previous transaction execution fails, and reentry of the entire process can be supported.

Figure 7:
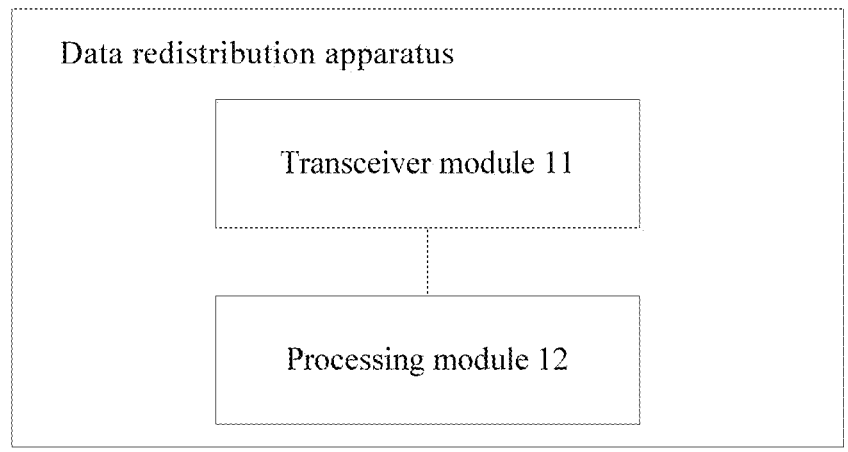
FIG. 7 is a schematic structural diagram of a data redistribution apparatus in a database cluster according to an embodiment of the present application.

FIG. 7 is a schematic structural diagram of a data redistribution apparatus in a database cluster according to an embodiment of the present disclosure. As shown in FIG. 7, the database cluster includes at least one first node, an original table is stored on the at least one first node. The data redistribution apparatus in this embodiment may be a master node of the database cluster, or a node in the at least one first node. In an embodiment the data redistribution apparatus includes a transceiver module 11 and a processing module 12. The processing module 12 is configured to, after a second node is newly added to the database cluster, start a data redistribution process, where the data redistribution process is used to redistribute the original table to the at least one first node and the second node, the original table includes a plurality of tuples, and a transaction identifier of each tuple is an identifier of a transaction that imports the tuple. The processing module 12 is further configured to, in the data redistribution process, send a first instruction to each of the at least one first node and the second node using the transceiver module 11, where the first instruction is used to instruct to create a temporary table on the at least one first node and the second node, the temporary table is created by a first transaction, and a transaction identifier of the first transaction is greater than a transaction identifier of an old tuple in the original table. The processing module 12 is further configured to send a second instruction to each of the at least one first node using the transceiver module 11, where the second instruction is used to instruct the at least one first node to associate, using the first transaction, an import operation for the original table with an import operation for the temporary table, so that a new tuple imported in the redistribution process is inserted into both the original table and the temporary table. The processing module 12 is further configured to send a third instruction to each of the at least one first node and the second node using the transceiver module 11, where the third instruction is used to instruct the at least one first node and the second node to select an old tuple from the original table based on the transaction identifier of the first transaction using a second transaction, and redistribute the selected old tuple to the temporary table. The processing module 12 is further configured to, after the second transaction ends, exchange metadata of the original table and metadata of the temporary table.

Optionally, the processing module 12 is configured to send, using the transceiver module 11, an instruction for creating an association rule for import operations for the original table and the temporary table, where the association rule is used to instruct the at least one first node to insert the imported new tuple into both the original table and the temporary table, or the processing module 12 is configured to send, using the transceiver module 11, an instruction for creating a trigger for import operations for the original table and the temporary table, where the trigger is configured to instruct the at least one first node to insert the imported new tuple into both the original table and the temporary table.

Optionally, that the processing module 12 is configured to exchange metadata of the original table and metadata of the temporary table may include the following. The processing module 12 is configured to set an access exclusive lock for each of the original table and the temporary table using a third transaction, exchange the metadata of the original table and the metadata of the temporary table, and modify distribution node information of the original table, where the modified distribution node information of the original table includes information about the at least one first node and the second node.

Optionally, the processing module 12 is further configured to set an access shared lock for the original table using the second transaction, where the access shared lock is used to allow a new tuple to be imported into the original table in the redistribution process.

Optionally, the transaction identifier includes a transaction snapshot or a transaction ID.

It should be noted that the first instruction, the second instruction, and the third instruction in this embodiment are instructions used to implement different operation functions, and the instruction may be a Structured Query Language (SQL) statement, a database execution plan, an indication message, or the like.

The data redistribution apparatus in this embodiment may be configured to execute the technical solutions of the method embodiments shown in FIG. 2 to FIG. 4, and implementation principles and technical effects of the data redistribution apparatus are similar to those of the method embodiments. Details are not described herein again.

An embodiment of the present disclosure further provides another data redistribution apparatus in a database cluster. A structure of the data redistribution apparatus may be the same as an internal structure of the data redistribution apparatus shown in FIG. 7. A processing module of the data redistribution apparatus is configured to perform the method in the embodiment shown in FIG. 6 to allow access to the database cluster and import of a new tuple during database cluster scale-in. For a specific implementation and an implementation effect, refer to the embodiment shown in FIG. 6. Details are not described herein again.

Figure 8:
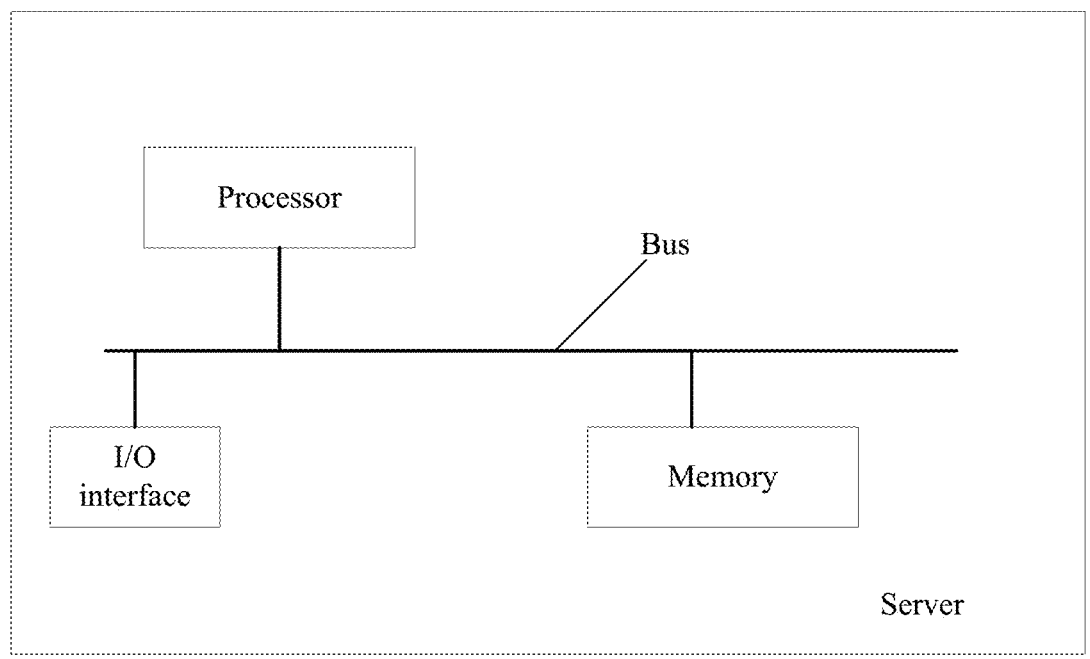
FIG. 8 is a schematic structural diagram of a server according to an embodiment of the present application.

FIG. 8 is a schematic structural diagram of a server according to an embodiment of the present disclosure. As shown in FIG. 8, the server may include a processor, an input/output (I/O) interface, and a memory. The I/O interface, namely, an input/output interface, is configured to send data or an instruction. The processor is connected to the I/O interface using an internal bus of the server, and the I/O interface is then connected to another node and an external device to finally implement information transmission between the processor, the another node, and the external device. In this embodiment, the processor may be a CPU, an application-specific integrated circuit (ASIC), or one or more integrated circuits configured to implement this embodiment of the present disclosure. The memory is configured to store an instruction. In this embodiment, during database cluster scale-out or scale-in, the processor invokes the instruction in the memory to execute the technical solutions of the method embodiments shown in FIG. 2 to FIG. 6, and implementation principles and technical effects of the processor are similar to those of the method embodiments. Details are not described herein again.

In an embodiment, the transceiver module shown in FIG. 7 is corresponding to the I/O interface shown in FIG. 8, and the processing module shown in FIG. 7 is corresponding to the processor shown in FIG. 8.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A data redistribution method implemented in a database cluster comprising a first node storing an original table, the data redistribution method comprising:
   starting a first transaction to start a data redistribution process after a second node is added to the database cluster to redistribute the original table to the first node and the second node, wherein the original table comprises a plurality of tuples, and wherein the first transaction comprises:
      creating a temporary table on the first node and the second node; and
      associating an import operation for the original table with an import operation for the temporary table;
   starting a second transaction comprising:
      inserting a new tuple imported in the data redistribution process into both the original table and the temporary table;
      subsequent to creating the temporary table, selecting an old tuple from the original table by searching the original table and based on a first transaction identifier that identifies the first transaction that creates the temporary table; and
      redistributing the old tuple to the temporary table, wherein a second transaction identifier identifies a transaction of importing the old tuple to the original table, and wherein a totality of a value corresponding to an entirety of the first transaction identifier is greater than a totality of a value corresponding to an entirety of the second transaction identifier; and
   exchanging metadata of the original table and metadata of the temporary table after the second transaction ends.

2. The data redistribution method of claim 1, wherein a tuple with a transaction identifier that is less than the first transaction identifier of the first transaction is the old tuple.

3. The data redistribution method of claim 1, wherein associating the import operation for the original table with the import operation for the temporary table comprises creating an association rule for inserting the new tuple into both the original table and the temporary table.

4. The data redistribution method of claim 1, wherein the exchanging the metadata of the original table and the metadata of the temporary table comprises:
   starting a third transaction comprising setting an access exclusive lock for each of the original table and the temporary table; and
   modifying distribution node information of the original table to include information about the first node and the second node.

5. The data redistribution method of claim 1, wherein the second transaction further comprises setting an access shared lock for the original table to allow the new tuple to be imported into the original table in the data redistribution process.

6. The data redistribution method of claim 1, wherein the first transaction identifier and the second transaction identifier comprise a transaction snapshot.

7. The data redistribution method of claim 1, wherein associating the import operation for the original table with the import operation for the temporary table comprises creating a trigger for inserting the new tuple into both the original table and the temporary table.

8. The data redistribution method of claim 1, wherein the first transaction identifier and the second transaction identifier comprise a transaction identity.

9. A data redistribution apparatus implemented in a database cluster comprising a first node storing an original table, the data redistribution apparatus comprising:
   a memory configured to store instructions; and
   a processor coupled to the memory and configured to execute the instructions to cause the data redistribution apparatus to be configured to:
      start a data redistribution process after a second node is newly added to the database cluster to redistribute the original table to the first node and the second node, wherein the original table comprises a plurality of tuples;
      send, to the first node and the second node, a first instruction to start a first transaction and create a temporary table, wherein a totality of a value corresponding to an entirety of a first transaction identifier identifying the first transaction that creates the temporary table is greater than a totality of a value corresponding to an entirety of a second transaction identifier identifying a transaction of importing an old tuple into the original table;
      send a second instruction to the first node to instruct the first node to associate an import operation for the original table with an import operation for the temporary table, wherein a new tuple imported in the data redistribution process is inserted into both the original table and the temporary table;
      send a third instruction to the first node and the second node to start a second transaction and redistribute the old tuple to the temporary table, wherein the old tuple is selected by searching the original table, based on the first transaction identifier, and subsequent to creation of the temporary table; and exchange metadata of the original table and metadata of the temporary table after the second transaction ends.

10. The data redistribution apparatus of claim 9, wherein the instructions further cause the data redistribution apparatus to be configured to send an association rule creation instruction to the first node to instruct the first node to create an association rule for inserting the new tuple into both the original table and the temporary table.

11. The data redistribution apparatus of claim 9, wherein the instructions further cause the data redistribution apparatus to be configured to start a third transaction to:
set an access exclusive lock for the original table and the temporary table; and
modify distribution node information of the original table to include information about the first node and the second node.

12. The data redistribution apparatus of claim 9, wherein the instructions further cause the data redistribution apparatus to be configured to set an access shared lock for the original table to allow new tuple to be imported into the original table during the second transaction.

13. The data redistribution apparatus of claim 9, wherein the first transaction identifier and the second transaction identifier comprise a transaction snapshot.

14. The data redistribution apparatus of claim 9, wherein the instructions further cause the data redistribution apparatus to be configured to send a trigger creation instruction to the first node to instruct the first node to create a trigger for inserting the new tuple into both the original table and the temporary table.

15. The data redistribution apparatus of claim 9, wherein the first transaction identifier and the second transaction identifier comprise a transaction identity (ID).

16. A database cluster, comprising:
a first node;
a second node; and
a data redistribution apparatus comprising:
a processor configured to start a data redistribution process after the second node is added to the database cluster, wherein the data redistribution process is used to redistribute an original table to the first node and the second node, and wherein the original table comprises a plurality of tuples; and
a transmitter coupled to the processor and configured to:
send a first instruction to start a first transaction and create a temporary table to the first node and the second node, wherein a totality of a value corresponding to an entirety of a first transaction identifier of the first transaction that creates the temporary table is greater than a totality of a value corresponding to an entirety of a second transaction identifier identifying a transaction of importing an old tuple in the original table;
send a second instruction to the first node to instruct the first node to associate an import operation for the original table with an import operation for the temporary table during the first transaction, wherein a new tuple imported in the data redistribution process is inserted into both the original table and the temporary table; and
send a third instruction to the first node and the second node to start a second transaction and redistribute the old tuple to the temporary table, wherein the old tuple is selected by searching the original table, based on the first transaction identifier, and subsequent to creation of the temporary table, and
wherein the processor is further configured to exchange metadata of the original table and metadata of the temporary table after the second transaction ends.

17. The database cluster of claim 16, wherein the processor is further configured to start a third transaction to:
set an access exclusive lock for the original table and the temporary table; and
modify distribution node information of the original table to include information about the first node and the second node.

18. The database cluster of claim 16, wherein there is a plurality of first nodes, and wherein the data redistribution apparatus is one of the plurality of first nodes.

19. The database cluster of claim 16, wherein the data redistribution apparatus is a master node included in the database cluster.

20. The database cluster of claim 16, wherein the first transaction identifier and the second transaction identifier comprise a transaction snapshot or a transaction identity (ID).

* * * * *